US010346247B1

(12) United States Patent
Gao et al.

(10) Patent No.: US 10,346,247 B1
(45) Date of Patent: Jul. 9, 2019

(54) ADJUSTABLE ERROR SENSITIVITY FOR TAKING DISKS OFFLINE IN A MAPPED RAID STORAGE ARRAY

(71) Applicant: EMC IP Holding Company LLC, Hopkinton, MA (US)

(72) Inventors: Hongpo Gao, Beijing (CN); Lili Chen, Hopkinton, MA (US); Jian Gao, Beijing (CN); Wayne Li, Beijing (CN); Ree Sun, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 15/499,669

(22) Filed: Apr. 27, 2017

(51) Int. Cl.
G06F 11/00 (2006.01)
G06F 11/10 (2006.01)
G06F 11/16 (2006.01)
G06F 3/06 (2006.01)

(52) U.S. Cl.
CPC ........ *G06F 11/1092* (2013.01); *G06F 3/0619* (2013.01); *G06F 3/0665* (2013.01); *G06F 3/0689* (2013.01); *G06F 11/1084* (2013.01); *G06F 11/1666* (2013.01); *G06F 2201/85* (2013.01)

(58) Field of Classification Search
CPC .... G06F 3/0619; G06F 3/0665; G06F 3/0689; G06F 11/1084; G06F 11/1092; G06F 11/1666
See application file for complete search history.

(56) References Cited

U.S. PATENT DOCUMENTS

| 6,405,284 B1* | 6/2002 | Bridge .................. G06F 3/0608 711/114 |
| 7,603,529 B1* | 10/2009 | MacHardy ............ G06F 3/0608 707/999.202 |
| 9,563,511 B1 | 2/2017 | Foley et al. |
| 9,690,660 B1 | 6/2017 | Robins et al. |
| 2006/0107013 A1* | 5/2006 | Ripberger ............. G06F 3/0605 711/170 |

(Continued)

OTHER PUBLICATIONS

Jamin Kang, et al.; "Distributing Mapped RAID Disk Extents When Proactively Copying From an EOL Disk," U.S. Appl. No. 15/581,935, filed Apr. 28, 2017.

(Continued)

Primary Examiner — Joshua P Lottich
(74) Attorney, Agent, or Firm — BainwoodHuang

(57) ABSTRACT

A method is performed by an extent pool manager running on a data storage device. It is configured to manage assignment of disk extents provided by a pool of drives to a set of mapped RAID extents. The method includes (a) receiving an indication that a particular drive has triggered an end-of-life (EOL) condition based on an error count of that drive and a standard sensitivity setting, (b) in response to receiving the indication, changing a sensitivity setting of other drives to be less sensitive than the standard sensitivity setting, and (c) remapping disk extents from the particular drive to the other drives of the pool while the other drives continue operation using the changed sensitivity setting. An apparatus, system, and computer program product for performing a similar method are also provided.

20 Claims, 4 Drawing Sheets

(56) References Cited

U.S. PATENT DOCUMENTS

| | | | | |
|---|---|---|---|---|
| 2008/0010494 | A1* | 1/2008 | Takizawa | G06F 11/0727 714/5.1 |
| 2009/0254636 | A1* | 10/2009 | Acedo | G06F 3/0607 709/220 |
| 2013/0073900 | A1* | 3/2013 | Li | G06F 11/1092 714/6.22 |
| 2014/0164849 | A1* | 6/2014 | Floeder | G06F 11/004 714/47.2 |
| 2016/0170851 | A1* | 6/2016 | Goldberg | G06F 11/2069 714/6.24 |

OTHER PUBLICATIONS

Jian Gao, et al.; "Disk Activity Balancing in Mapped RAID Storage Arrays by Data Remapping," U.S. Appl. No. 15/581,944, filed Apr. 28, 2017.

Jian Gao, et al.; "Providing RAID-10 With a Configurable RAID Width Using a Mapped RAID Group," U.S. Appl. No. 15/499,546, filed Apr. 27, 2017.

Jian Gao, et al.; "Reducing Concurrency Bottlenecks While Rebuilding a Failed Drive in a Data Storage System," U.S. Appl. No. 15/498,609, filed Apr. 27, 2017.

Jian Gao, et al.; "Splitting a Group of Physical Data Storage Drives Into Partnership Groups to Limit the Risk of Data Loss During Drive Rebuilds in a Mapped RAID (Redundant Array of Independent Disks) Data Storage System," U.S. Appl. No. 15/497,984, filed Apr. 26, 2017.

Peter Puhov, et al.; "Virtual Drive Based RAID Groups," U.S. Appl. No. 15/393,859, filed Dec. 29, 2016.

Robert P. Foley, et al.; "Repairing RAID Systems At Per-Stripe Granularity," U.S. Appl. No. 15/499,102, filed Apr. 27, 2017.

Shaoqin Gong, et al.; "Disk Extent Rebalancing in Mapped RAID Storage Arrays," U.S. Appl. No. 15/495,240, filed Apr. 24, 2017.

Nickolay Alexandrovich Dalmatov; "Re-Placing Data Within a Mapped-RAID Environment," International Patent Application Serial No. PCT/RU2017/000273, filed Apr. 27, 2017.

\* cited by examiner

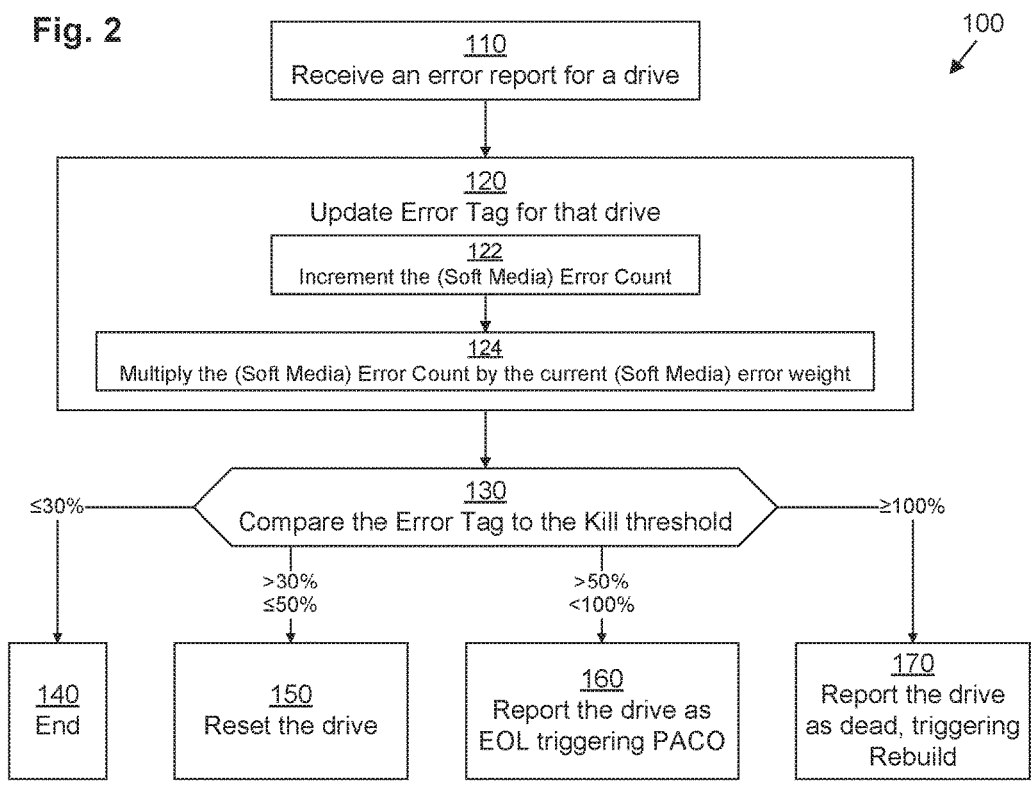
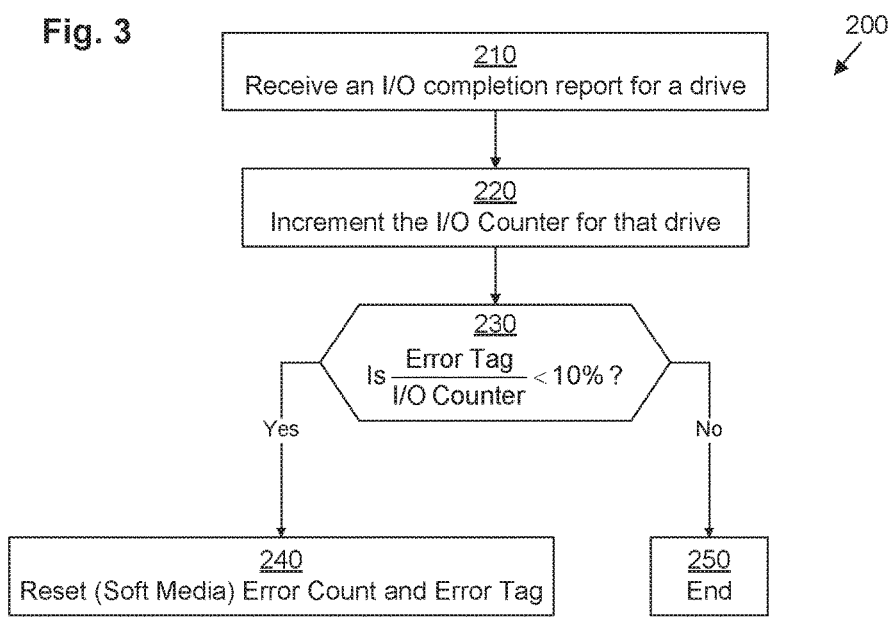

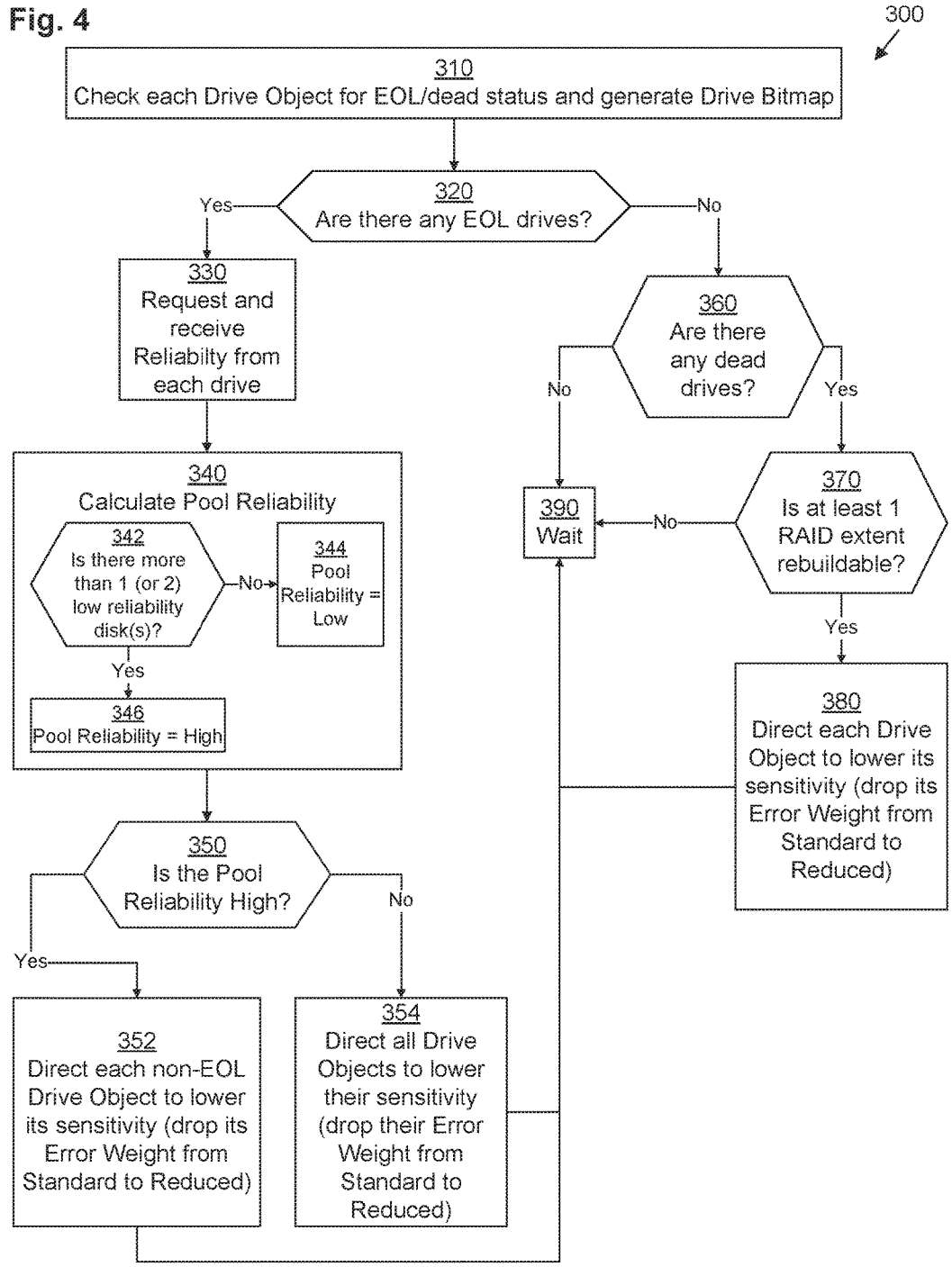

ADJUSTABLE ERROR SENSITIVITY FOR TAKING DISKS OFFLINE IN A MAPPED RAID STORAGE ARRAY

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Many conventional data storage appliances use RAID (redundant array of independent disks) technology to store large volumes of data across numerous physical storage drives without requiring user machines to address each individual disk. RAID systems also frequently store data redundantly so data can be recovered if one or more storage drives fail unexpectedly.

Some data storage appliances using RAID technology include spare storage drives which are reserved as "hot spares" in case one or more storage drives fail. In the event of a drive failure, the system can be "rebuilt" by reconstructing data from the failed drive using data from the remaining drives and then writing the recovered data to a spare drive. Once all the recovered data has been written to the spare drive, the system can continue normal operation.

SUMMARY

Unfortunately, conventional data storage appliances using RAID may experience performance limitations. Upon failure of a drive, performing a rebuild of the system requires reading data from the remaining drives and copying the reconstructed data to a spare drive which may have limited write performance. The speed of rebuilding the system will be bottlenecked by the maximum write throughput for writing the reconstructed data to the spare drive. The system is vulnerable to permanent data loss if an additional drive fails before the rebuild process is completed.

The speed of the rebuild process can be improved by using mapped RAID techniques. In mapped RAID, the system distributes data across RAID extents which are made up of disk extents. The disk extents of each RAID extent are provided by different physical storage drives. Instead of reserving one or more entire physical drives as spares, mapped RAID allocates spare disk extents distributed across a large pool of drives in the data storage appliance. The performance bottleneck associated with rebuilding is reduced when writing the rebuilt data is distributed across multiple drives.

Performance and fault tolerance can be further improved by proactively copying disk extents from a drive that is anticipated to imminently fail onto the spare extents. Once the disk extents have been proactive copied, the drive that is expecting imminent failure can be taken out of service. This approach avoids performance penalties caused by the rebuild process as long as the imminently-failing drive is still able to perform at moderate performance levels (without making too many errors). A drive can be determined to be imminently-failing if it returns too many errors of certain types (such as read failures). If the errors continue beyond a further limit, the drive will be marked as failed, in which case it must be rebuilt rather than proactively copied.

However, it is not uncommon for several drives within a mapped RAID pool to all experience error rates leading to ultimate failure at approximately the same time. This is problematic because if two such drives fail before one has been rebuilt, there is high likelihood of data loss (e.g., in a situation in which a single-fault-tolerant scheme is used, such as RAID-5). If two drives within a mapped RAID pool are being proactively-copied at the same time, there is a substantial risk that both drives will fail before either is done being proactively copied, which could result in data loss. In addition, if one drive is being rebuilt, there is a substantial risk that a second drive might experience enough errors to also be deemed to have failed, which could also result in data loss.

In order to overcome these risks, it would be desirable to minimize the likelihood of a second drive failing while a first drive is either being rebuilt or proactively copied. In contrast with prior approaches, improved techniques adjust an error sensitivity setting of drives in a mapped RAID pool when the mapped RAID pool is in a perilous state. Thus, for example, if one drive is being proactively-copied and another drive is in a "degraded" state (in which it has a high error rate that might soon cause it to be considered imminently-failing), the error sensitivity setting is adjusted so that all drives in the pool (including the one currently being proactively copied) are less likely to be considered to have failed. If one drive is being proactively-copied but no other drive is in a "degraded" state, the error sensitivity setting is adjusted so that other drives in the pool (not including the one currently being proactively copied) are less likely to be deemed to be imminently-failing. If one drive is being rebuilt, the error sensitivity setting is adjusted so that all other drives in the pool are less likely to be deemed to be imminently-failing.

In one embodiment, a method is performed by an extent pool manager running on a data storage device. The extent pool manager is configured to manage assignment of disk extents provided by a pool of storage drives of the data storage device to a set of mapped RAID extents. The method includes (a) receiving an indication that a particular storage drive of the plurality of storage drives of the data storage device has triggered an end-of-life (EOL) condition based on an error count of that data storage drive and a standard sensitivity setting, (b) in response to receiving the indication, changing a sensitivity setting of other storage drives of the plurality of storage drives to be less sensitive than the standard sensitivity setting, and (c) remapping disk extents from the particular storage drive to the other storage drives of the pool of storage drives while the other storage drives of the pool of storage drives continue operation using the changed sensitivity setting. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

FIG. 2 is a flowchart depicting example methods of various embodiments.

FIG. 3 is a flowchart depicting example methods of various embodiments.

FIG. 4 is a flowchart depicting example methods of various embodiments.

DETAILED DESCRIPTION OF THE INVENTION

Embodiments are directed to techniques for minimizing the likelihood of a second drive failing while a first drive is either being rebuilt or proactively copied. In contrast with prior approaches, improved techniques adjust an error sensitivity setting of drives in a Mapped RAID (Redundant Array of Independent Disks) pool when the Mapped RAID pool is in a perilous state. Thus, for example, if one drive is being proactively-copied and another drive is in a "degraded" state (in which it has a high error rate that might soon cause it to be considered imminently-failing), the error sensitivity setting is adjusted so that all drives in the pool (including the one currently being proactively copied) are less likely to be considered to have failed. If one drive is being proactively-copied but no other drive is in a "degraded" state, the error sensitivity setting is adjusted so that other drives in the pool (not including the one currently being proactively copied) are less likely to be deemed to be imminently-failing. If one drive is being rebuilt, the error sensitivity setting is adjusted so that all other drives in the pool are less likely to be deemed to be imminently-failing.

Figure 1:
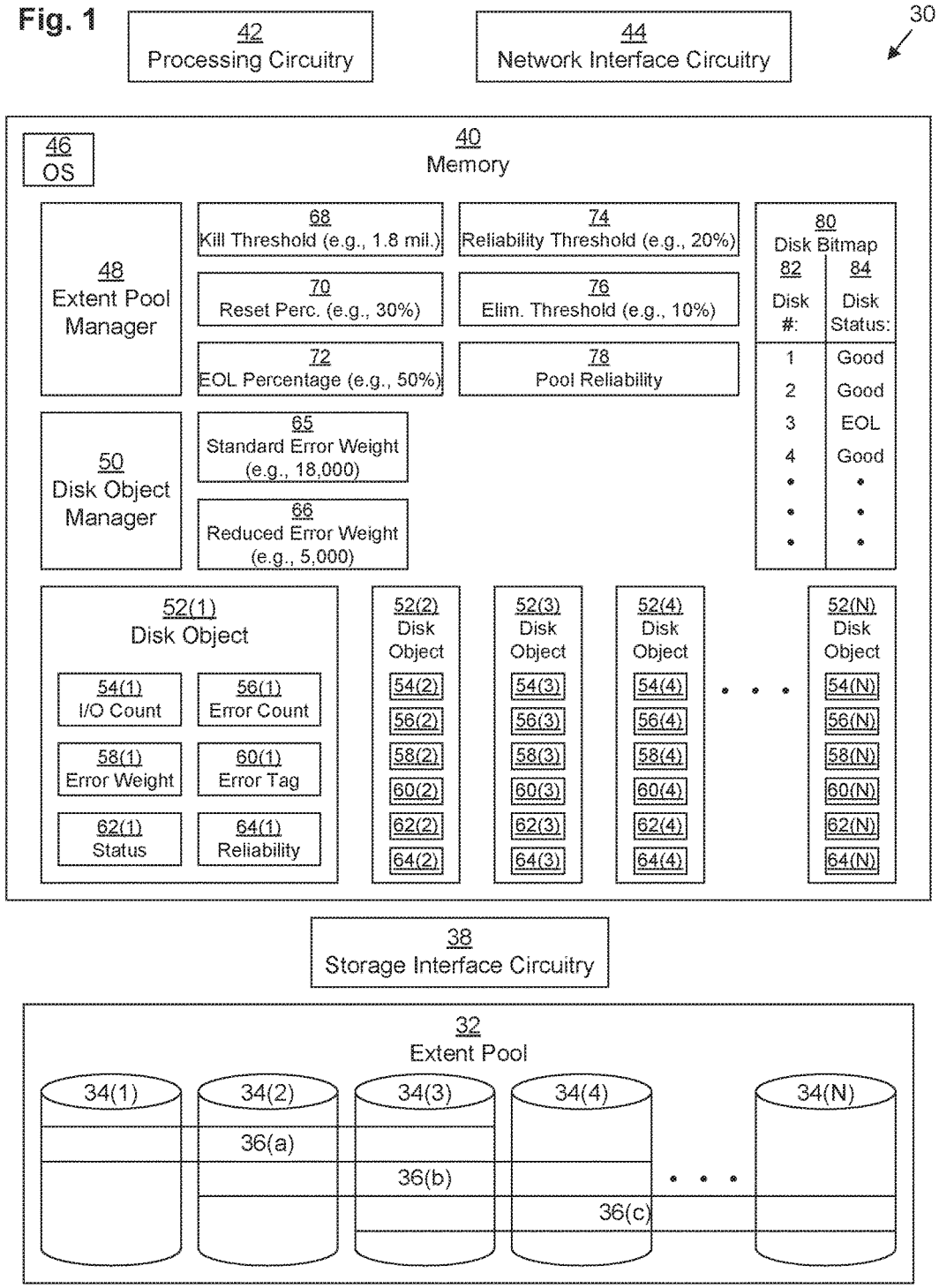
FIG. 1 is a block diagram depicting an example system and apparatus for use in connection with various embodiments.

FIG. 1 depicts a computing device 30 serving as a data storage system (DSS). Computing device 32 may be any kind of computing device, such as, for example, a personal computer, workstation, server computer, enterprise server, DSS rack server, laptop computer, tablet computes, smart phone, mobile computer, etc. Typically, computing device 30 is a DSS rack server.

DSS computing device 30 includes network interface circuitry 44, processing circuitry 42, storage interface circuitry 38, memory 40, and persistent data storage drives 34 arranged in one or more extent pools 32. DSS computing device 30 may also include other components as are well-known in the art, including interconnection circuitry.

Network interface circuitry 44 may include one or more Ethernet cards, cellular modems, Fibre Channel (FC) adapters, Wireless Fidelity (Wi-Fi) wireless networking adapters, and/or other devices for connecting to a network (not depicted). Processing circuitry 42 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

In some embodiments, processing circuitry 42, network interface circuitry 44, memory 40, and storage interface circuitry 38 may all be mounted on a single board, known as a storage processor (SP). There may be more than one SP installed in DSS 30 for redundancy and performance reasons.

Persistent storage drives 34 may include any kind of persistent storage devices, such as, for example, hard disk drives, solid-state storage devices, flash drives, etc. Storage interface circuitry 38 controls and provides access to persistent storage drives 34. Storage interface circuitry 38 may include, for example, SCSI, SAS, ATA, SATA, FC, and/or other similar controllers and ports. Persistent storage drives 34 are arranged into one or more extent pools 32, each of which includes a set of storage drives 34. As depicted in FIG. 1, DSS 30 includes one extent pool 32, which includes N storage drives 34(1), 34(2), 34(3), 34(4), . . . , 34(N). Extent pool 32 has a Mapped RAID configuration. As depicted, extent pool 32 is configured in a RAID-5 configuration, with each RAID extent 36 being made up of three disk extents (not depicted), each from a different storage drive 34 from the extent pool 32. A typical disk extent may have a capacity of four gigabytes, for example. As depicted, RAID extent 36($a$) is distributed across storage drives 34(1), 34(2), and 34(3), while RAID extent 36($b$) is distributed across storage drives 34(2), 34(3), and 34(4) and RAID extent 36($c$) is distributed across storage drives 34(3), 34(4), and 34(N). Logical disks (not depicted) are made up of one or more RAID extents 36.

It should be understood that the RAID extents 36 are shown containing three disk extents for purposes of illustration. However, a RAID extent 36 need not contain exactly three disk extents and, in various embodiments, may contain any number of disk extents. It should also be understood that a RAID extent 36 may be implemented as a data structure representing a set of relations between logical block addresses and disk extents. While FIG. 1 shows three RAID extents 36, this is by way of example only. It should be understood that extent pool 32 may have any number of RAID extents 36.

In some embodiments, a RAID extent 36 must not contain more than one disk extent from any one of the storage drives 34 (i.e., each disk extent in a RAID extent 36 must be provided by a different storage drive 34 from each of the other disk extents in that RAID extent 36). Further, in some arrangements, each RAID extent 36 must contain a specific number of disk extents.

For example, some embodiments may implement RAID-5 and require exactly five disk extents in each RAID extent 36. Other embodiments may implement RAID-5 with exactly eight disk extents in each RAID extent 36. Still other arrangements may implement other RAID configurations, such as RAID-6, or RAID-10, and require various other numbers of disk extents in each RAID extent 36. Furthermore, some embodiments may implement various combinations of RAID configurations.

Memory 40 may be any kind of digital system memory, such as, for example, random access memory (RAM). Memory 40 stores one or more operating systems (OSes) 46 in operation (e.g., Linux, UNIX, Windows, MacOS, or a similar operating system), various applications executing on processing circuitry 42, and application data. For example, memory 40 stores extent pool manager 48 and disk object manager 50, both of which execute on processing circuitry 42, as well as data used by those applications.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage drives 34 is configured to store programs and data even while the DSS computing device 30 is powered off. The OS 46 and the applications 48, 50 are typically stored in this persistent storage portion of memory 40 or on persistent storage drives 34 so that they may be loaded into a system portion of memory 40 from this persistent storage portion of memory 40 or persistent storage drives 34 upon a system restart. These applications 48, 50 when stored in non-transient form either in the volatile portion of memory 40 or on persistent storage drives 34 or in persistent portion of memory 40, form a computer program product. The processing circuitry 42 running one or more of these applications or drivers 48, 50 thus forms a specialized circuit constructed and arranged to carry out the various processes described herein.

Disk object manager 50 executes to manage a respective disk object 52 (depicted as disk objects 52(1), 52(2), 52(3), 52(4), . . . , 52(N)) for each storage disk 34. Each disk object 52 stores statistics for its respective storage drive 34. These statistics include an input/output (I/O) count 54, an error count 56, an error weight 58, an error tag 60, a status 62, and a reliability 64.

As the DSS 30 processes I/Os aimed at the LUNs, disk object manager 50 keeps track of the statistics for each storage drive 34 that each I/O is served by. For example, for an I/O directed at a LUN that includes RAID group 36(a) might include a first I/O directed at storage drive 34(1) and a second I/O directed at storage drive 34(2). Upon successful completion of the first I/O, disk object manager 50 increments the I/O count 54(1) for the disk object 52(1) associated with storage drive 34(1). Upon encountering an error with the second I/O, disk object manager 50 increments the error count 56(2) for the disk object 52(2) associated with storage drive 34(2).

An error may be encountered for a particular storage drive 34(x) when, in response to a storage command (e.g., a SCSI command) directed at that storage drive 34(x), that storage drive 34(x) returns an error code (e.g., a SCSI check condition). In response to the disk object manager 50 intercepting that error code, it may increment the error count 56(x) for that storage drive 34(x). In some embodiments, disk object 52 may maintain several different error counts 56 associated with different types of errors (e.g., based on a value of a SCSI key code qualifier returned with the SCSI check condition). For example, in one embodiment, SCSI key code qualifiers with sense key values of three may be deemed "soft media" errors and kept track of in a soft media error count variable (not depicted), while SCSI key code qualifiers with sense key values of four, five, or six may be deemed "hard media" errors and kept track of in a hard media error count variable (not depicted). An error may also be encountered upon a failure to receive any response from a storage drive 34(x) within a timeout period or in response to the DSS determining that that storage drive 34(x) is not connected. In some embodiments, disk object manager 50 may deem those errors as "link" errors, keeping track of those errors in a link error count variable (not depicted).

Each disk object 52 has a respective error weight 58 that allows its respective error count 56 to be converted into an error tag score 60. Typically, the error weight 58 for all disk objects 52 is initially set to the value of a standard error weight 65 as stored within memory 40 as a constant, but under certain conditions, disk object manager 50 may change the error weight 58(x) for a particular storage drive 52(x) to instead have the value of the reduced error weight 66 as stored within memory 40 as a constant. For example, in one embodiment, the standard error weight 65 may be set to a value of 18,000, while the reduced error weight 66 is set to a value of 5,000. In another embodiment, the reduced error weight 66 is set to a value of 100. In one embodiment, the error tag 60(x) for a particular disk object 52(x) is defined by the error count 56(x) multiplied by the error weight 58(x).

In some embodiments, there may be different error weights 58, 65, 66 and error tags 60 associated with different error types. In one embodiment, the error weight 58 is only changed (between standard error weight 65 and reduced error weight 66) with respect to the soft media error count, while the error weights 58 for hard media and link errors are constants.

Each disk object 52 may also store a respective status 62. Disk object manager 50 may set the status 62(x) for a particular disk object 52(x) based on a comparison between a ratio of the error tag 60(x) to a standardized kill threshold 68 and a set of standardized percentages 70, 72. For example, in one embodiment, kill threshold 68 is set to a value of 1.8 million, while a reset percentage 70 is set to 30% and an end-of-life (EOL) percentage 72 is set to 50%. Thus, if the ratio of the error tag 60(x) to the kill threshold 68 equals or exceeds 100% (i.e., if the error tag 60(x) exceeds the kill threshold 68), then the disk object 52(x) has a status 62(x) of "dead." If, however, the ratio of the error tag 60(x) to the kill threshold 68 exceeds the EOL percentage 72 (50%) without reaching 100%, the disk object 52(x) has a status 62(x) of "EOL." If the ratio of the error tag 60(x) to the kill threshold 68 exceeds the reset percentage 70 (30%) without reaching 50%, the disk object 52(x) has a status 62(x) of "good." In some embodiments, extent pool manager 48 stores a disk bitmap 80 that keeps track of the respective status 62(x) of each disk object 52(x). For example, as depicted, disk bitmap relates the disk number 82 of each disk object 52 to its respective disk status 84. As depicted, disk #1, represented by disk object 52(1), has a disk status 84 of good; disk #2, represented by disk object 52(2), has a disk status 84 of good; disk #3, represented by disk object 52(3), has a disk status 84 of EOL; and disk #4, represented by disk object 52(4), has a disk status 84 of good. It should be understood that although disk bitmap 80 is depicted as a table having columns 82, 84, disk bitmap 80 may be arranged as a bitmap. For example, each disk status 84 may be a two bit value, and the disk bitmap 80 may be indexed into by multiplying the disk number 82 (minus one) by 2 bits.

Each disk object 52 may also store a respective reliability 64. Disk object manager 50 may set the reliability 64(x) for a particular disk object 52(x) based on a comparison between a ratio of the error tag 60(x) to the I/O count 54(x) and a reliability threshold 74. For example, in one embodiment, reliability threshold 74 is set to a value of 20%. Thus, if the ratio of the error tag 60(x) to the I/O count 54(x) equals or exceeds 20%, then the disk object 52(x) has a reliability 64(x) of "high." If, however, the ratio of the error tag 60(x) to the I/O count 54(x) is less than 20%, then the disk object 52(x) has a reliability 64(x) of "low." Extent pool manager 48 may combine the reliabilities 64 of the various disk objects 52 of the extent pool 32 in order to generate a pool reliability 78 of the extent pool 32.

Memory 40 may also store an elimination threshold 76. The elimination threshold 76. May be set to, for example, 10%. See below in connection with FIG. 3.

It should be understood that the values of the various thresholds 68, 74, 76, percentages 70, 72, and weights 65, 66 may vary from embodiment to embodiment. However, the reset percentage 70 is typically within the range of 25% to 35%, the EOL percentage 72 is typically within the range of 40% to 60%, the reliability threshold 74 is typically within the range of 15% to 25%, and the elimination threshold 76 is typically within the range of 5% to 15%, for example.

FIG. 2 illustrates an example method 100 performed by disk object manager 50 for responding to an I/O error. It should be understood that any time a piece of software (e.g., extent pool manager 48, disk object manager 50, etc.) is described as performing a method, process, step, or function, in actuality what is meant is that a computing device (e.g., DSS computing device 30) on which that piece of software is running performs the method, process, step, or function when executing that piece of software on its processing circuitry 42. It should be understood that one or more of the steps or sub-steps of method 100 may be omitted in some embodiments. Similarly, in some embodiments, one or more steps or sub-steps may be combined together or performed in a different order. Method 100 is performed by DSS computing device 30. More specifically, method 100 is performed by disk object manager 50 running on DSS computing device 30 in combination with other components of DSS computing device 30.

In step 110, disk object manager 50 receives an error report for a particular storage drive 34(x). As mentioned above, this error report may take the form of an error code or a timeout, for example.

In response, in step 320, disk object manager 50 updates the error tag 60(x) for that storage drive 34(x). In some embodiments, step 320 may be accomplished by performing sub-steps 122 and 124.

In sub-step 122, disk object manager 50 increments the error count 56(x) for that storage drive 34(x). In some embodiments (omitted hereinafter for clarity of presentation), instead of incrementing a generic error count 56(x), disk object manager 50 increments an error count that is specific to the type of error, such as, for example, a soft media error count in response to receiving a soft media error.

In sub-step 124, disk object manager 50 multiplies the (already incremented) error count 56(x) by the error weight 58(x) for that storage drive 34(x), storing the resulting product as the error tag 60(x). For example, in the case of a soft media error, the error weight 58(x) for that storage drive 34(x) will be the standard error weight 65 under normal circumstances, but it will be the reduced error weight 66 under certain special circumstances (see below in connection with FIG. 4).

In step 130, disk object manager 50 compares the computed error tag 60(x) to the kill threshold 68, yielding a ratio.

If the ratio of step 130 is less than or equal to the reset percentage 70 (e.g., 30%), method 100 terminates without taking any remedial action (step 140). It should be understood that although comparisons are sometimes specified as being "less than" or "less than or equal to," for example, either may be substituted, depending on the embodiment, as long as there is internal consistency (e.g., ≤30% to invoke step 140 and >30% to invoke step 150 or <30% to invoke step 140 and ≥30% to invoke step 150).

If the ratio of step 130 is less than or equal to the EOL percentage 72 (e.g., 50%) but greater than the reset percentage 70 (e.g., 30%), then operation proceeds with step 150, in which disk object manager 50 initiates a reset of the storage drive 34(x) in order to address a situation in which the storage drive 34(x) is generating errors because of a temporary condition, such as a configuration error, that may be relieved upon powering the drive off and back on again.

If the ratio of step 130 is less than 100% but greater than the EOL percentage 72 (e.g., 50%), then operation proceeds with step 160, in which disk object manager 50 reports the storage drive 34(x) as having reached EOL (meaning that it has been deemed to be in imminent danger of failing), which causes the DSS 30 to begin proactively copying disk extents from that storage drive 34(x) to spare disk extents on other storage drives 34 of the extent pool 32 (known as "PACO," or a "ProActive Copy Operation").

If the ratio of step 130 is at least equal to 100%, then operation proceeds with step 170, in which disk object manager 50 reports the storage drive 34(x) as having died (meaning that it has been deemed to be so unreliable that it can no longer be trusted to report its data accurately), which causes the DSS 30 to begin rebuilding the disk extents of that storage drive 34(x) onto spare disk extents on other storage drives 34 of the extent pool 32 using well-known parity-based rebuilding techniques.

FIG. 3 illustrates an example method 200 performed by disk object manager 50 when an I/O completes without error. It should be understood that one or more of the steps of method 200 may be omitted in some embodiments. Similarly, in some embodiments, one or more steps may be combined together or performed in a different order. Method 200 is performed by DSS computing device 30. More specifically, method 200 is performed by disk object manager 50 running on DSS computing device 30 in combination with other components of DSS computing device 30.

In step 210, disk object manager 50 receives a report of successful completion of an I/O operation directed at a particular storage drive 34(x).

In response, in step 220, disk object manager 50 increments the I/O count 54(x) for that storage drive 34(x). In some embodiments, the I/O count 54(x) begins at a value of zero, while, in other embodiments, the I/O count 54(x) begins at a non-zero value such as, for example, the kill threshold 68, even before any I/Os have been completed.

In step 230, disk object manager 50 computes a ratio of the error tag 60(x) for that storage drive 34(x) to the (recently incremented) I/O count 54(x) for that storage drive 34(x) and compares the ratio to the elimination threshold 76 (e.g., 10%). If the ratio is less than the elimination threshold 76, then operation proceeds with step 240, in which the disk object manager 50 resets both the error count 56(x) and the error tag 60(x) to zero. This is done because if there is a large gap between errors for a storage drive 34(x) even though that storage drive 34(x) has been performing a lot of I/Os, it is likely that any problems with that storage drive 34(x) have been successfully resolved (e.g., by resetting in step 150 above). If the ratio is not less than the elimination threshold 76, then operation proceeds with step 250, in which method 200 terminates without taking any special action.

FIG. 4 illustrates an example method 300 performed by extent pool manager 48 for selectively adjusting the error sensitivities (e.g., the error weights 58) of various storage drives 34 based on the status 62 and/or reliability 64 of the storage drives 34 in an extent pool 32. It should be understood that one or more of the steps or sub-steps of method 300 may be omitted in some embodiments. Similarly, in some embodiments, one or more steps or sub-steps may be combined together or performed in a different order. Method 300 is performed by DSS computing device 30. More specifically, method 300 is performed by extent pool manager 48 running on DSS computing device 30 in combination with other components of DSS computing device 30.

In some embodiments, extent pool manager 48 performs method 300 periodically for each extent pool 32, such as, for example, every three seconds.

In step 310, extent pool manager 48 checks each drive object 52 for its status 62 in order to generate an updated disk bitmap 80. Then, in step 320, extent pool manager 48 determines whether there are any storage drives 34 which have been marked as having an EOL status 84 within disk bitmap 80. If there are, then operation proceeds with step 330; otherwise, operation proceeds with step 360.

In step 330, when there is at least one EOL storage drive 34, extent pool manager 48 requests the reliability 64 from each storage drive object 52. Then, in step 340, extent pool manager 48 calculates pool reliability 78 for extent pool 32. In some embodiments, extent pool manager 48 performs step 340 by performing sub-steps 342-346. In sub-step 342, extent pool manager 48 determines whether there is more than one storage disk 34 whose respective disk object 52 has a reliability 64 that is "low" (which may also be referred to as a "degraded" reliability). See below in connection with FIG. 5 for how disk object manager 50 determines the reliability 64 for each disk object 52. Typically, any storage drive 34 that is already EOL has a "low" reliability, so if any other storage drive 34 also has a "low" reliability, then sub-step 342 will yield an affirmative result. In some embodiments (e.g., if extent pool 32 is configured to use RAID-6 or another double-fault-tolerant redundancy scheme), instead of determining whether there is more than one storage disk 34 whose respective disk object 52 has a reliability 64 that is "low," extent pool manager 48 determines whether there are more than two storage disks 34 whose respective disk objects 52 have a reliability 64 that is "low."

If sub-step 342 yields a negative result, operation proceeds with sub-step 344, in which extent pool manager 48 sets the pool reliability 78 to be "low."

If sub-step 342 yields an affirmative result, operation proceeds with sub-step 346, in which extent pool manager 48 sets the pool reliability 78 to be "high."

After step 340, extent pool manager 48 branches execution based on whether the pool reliability 78 is high (step 352) or low (step 354). In step 352, extent pool manager 48 directs each drive object 52 that does not have EOL or dead status 62 (i.e., having good status) to lower its respective sensitivity, e.g., by lowering its respective error weight 58 from the standard error weight 65 to the reduced error weight 66. Thus, when the pool reliability 78 is high but there is one EOL storage drive 34 in the extent pool 32, it becomes relatively difficult for a second storage drive 34 to become EOL in order to give sufficient time for PACO to complete on the EOL storage drive 34 before PACO begins on another storage drive 34.

In step 354, extent pool manager 48 directs every drive object 52 regardless of its status 62 (i.e., having either good or EOL status) to lower its respective sensitivity, e.g., by lowering its respective error weight 58 from the standard error weight 65 to the reduced error weight 66. Thus, when there is at least one EOL storage drive 34 in the extent pool 32 but the pool reliability 78 is low, not only does it become relatively difficult for another storage drive 34 to become EOL, but it also becomes relatively difficult for an already-EOL storage drive 32 to be marked as dead in order to give sufficient time for PACO to complete on the EOL storage drives 34 before they fail.

Steps 352, 354 may be performed by extent pool manager 48 sending a command to disk object manager 50 directing the disk object manager 50 to modify the error weights 58 of the appropriate disk objects 52.

Following steps 352, 354, operation proceeds to step 390, in which extent pool manager 48 waits until the next iteration of method 300 is scheduled to begin (e.g., three seconds) to return to step 310. In the meantime, operation of the DSS 30 proceeds, processing I/O requests as normal and continuing to perform PACO and rebuild operations on storage drives 34 that have already been marked as EOL or dead, but if method 100 is invoked in the meantime on any given storage drive 34 in the extent pool 32, operation of method 100 may be affected by the lowered error weight 58 of that drive.

In step 360, when there are no EOL storage drive 34, extent pool manager 48 determines whether there are any storage drives 34 which have been marked as having a dead status 84 within disk bitmap 80. If there are, then operation proceeds with step 370; otherwise, operation proceeds with step 390, in which extent pool manager 48 waits until the next iteration of method 300 is scheduled to begin (e.g., three seconds) to return to step 310. In some embodiments, upon step 360 yielding a negative answer, extent pool manager 48 may, at that time, send a command to disk object manager 50 directing the disk object manager 50 to reset the error weights 58 of all disk objects 52 back to the standard error weight 65 prior to proceeding to step 390.

In step 370, extent pool manager 48 branches execution based on whether the extent pool 32 includes at least one RAID extent 36 that is rebuildable. For example, if the extent pool 32 is configured using RAID-5, is there at least one RAID extent 36 which has exactly one disk extent on a dead storage drive 34? If so, that RAID extent 36 is rebuildable using the remaining disk extents of that RAID extent 36. If, however, a RAID extent 36 has two disk extents on failed storage drives 34, then, there is too much data missing, and that RAID extent is no longer rebuildable. On the other hand, if a RAID extent 36 has none of its disk extents on a failed storage drive 34, then it is also not rebuildable because it does not currently require any rebuilding. Typically, if there is only one dead storage drive 34 in the extent pool 32, then the extent pool 32 includes at least one RAID extent 36 that is rebuildable. If there are two dead storage drives 34 in the extent pool 32, then there is a good chance that extent pool 32 includes at least one RAID extent 36 that is no longer rebuildable, but the extent pool 32 may have at least one RAID extent 36 that is still rebuildable. If the extent pool 32 is configured using RAID-6, however, the appropriate question to ask is whether there is at least one RAID extent 36 which has either one or two disk extents on a dead storage drive 34. In such a case, typically, as long as there are only one or two dead storage drive 34 in the extent pool 32, then the extent pool 32 includes at least one RAID extent 36 that is rebuildable.

If step 370 yields an affirmative result, then operation proceeds with step 380. Otherwise, operation proceeds with step 390, in which extent pool manager 48 waits until the next iteration of method 300 is scheduled to begin (e.g., three seconds) to return to step 310. In some embodiments, upon step 370 yielding a negative answer, extent pool manager 48 may, at that time, send a command to disk object manager 50 directing the disk object manager 50 to reset the error weights 58 of all disk objects 52 back to the standard error weight 65 prior to proceeding to step 390.

In step 380, extent pool manager 48 directs every drive object 52 regardless of its status 62 (i.e., having either good or EOL status) to lower its respective sensitivity, e.g., by lowering its respective error weight 58 from the standard error weight 65 to the reduced error weight 66. Thus, when there is at least one dead storage drive 34 in the extent pool 32, it become relatively difficult for another storage drive 34 to fail in order to give sufficient time for rebuild operations to complete for the failed storage drive 34 before another storage drive 34 also fails, at which point there could be a permanent loss of data. Step 380 may be performed by extent pool manager 48 sending a command to disk object manager 50 directing the disk object manager 50 to modify the error weights 58 of the disk objects 52.

Following step 380, operation proceeds to step 390, in which extent pool manager 48 waits until the next iteration of method 300 is scheduled to begin (e.g., three seconds) to return to step 310. In the meantime, operation of the DSS 30 proceeds, processing I/O requests as normal and continuing to perform PACO and rebuild operations on storage drives 34 that have already been marked as EOL or dead, but if method 100 is invoked in the meantime on any given storage drive 34 in the extent pool 32, operation of method 100 may be affected by the lowered error weight 58 of that drive.

Figure 5:
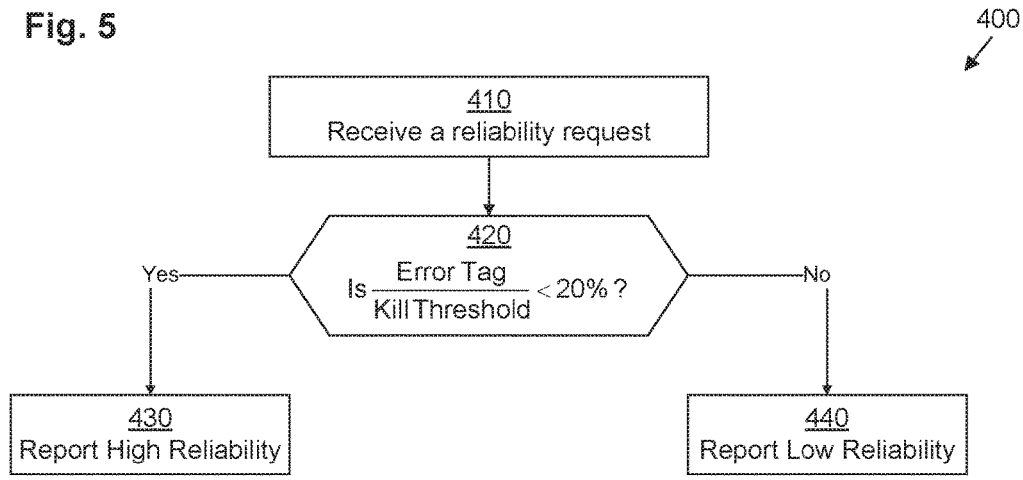
FIG. 5 is a flowchart depicting example methods of various embodiments.

FIG. 5 illustrates an example method 400 performed by disk object manager 50 for responding to reliability requests from extent pool manager 48 (see above in connection with step 330 of FIG. 4). It should be understood that one or more of the steps of method 400 may be omitted in some embodiments. Similarly, in some embodiments, one or more steps may be combined together or performed in a different order. Method 400 is performed by DSS computing device 30. More specifically, method 400 is performed by disk object manager 50 running on DSS computing device 30 in combination with other components of DSS computing device 30.

In step 410, disk object manager 50 receives a reliability request directed at a particular disk object 52(x) (e.g., from extent pool manager 48 performing step 330 of method 300). In response, in step 420, disk object manager 50 determines whether the ratio of the error tag 60(x) for that disk object 52(z) to the kill threshold 68 is less than the reliability threshold 74 (e.g., 20%). If so, operation proceeds with step 430, in which disk object manager 50 responds to the reliability request by reporting that the reliability 64(x) is high. Otherwise, operation proceeds with step 440, in which disk object manager 50 responds to the reliability request by reporting that the reliability 64(x) is low.

Figure 6:
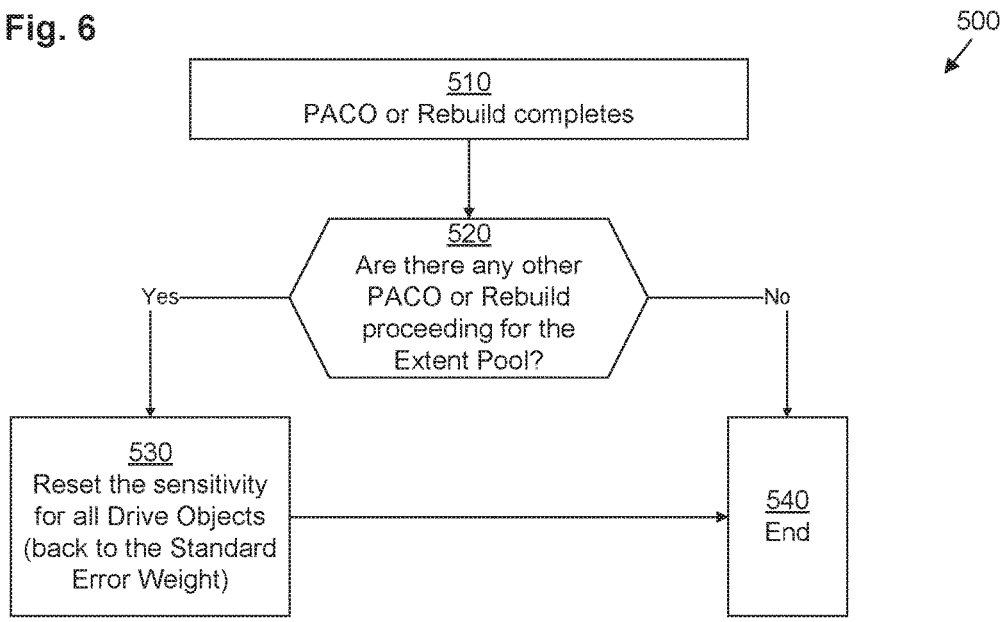
FIG. 6 is a flowchart depicting example methods of various embodiments.

FIG. 6 illustrates an example method 500 performed by extent pool manager 48 for responding to completion of PACO or rebuild operations for a storage drive 34. It should be understood that one or more of the steps or sub-steps of method 500 may be omitted in some embodiments. Similarly, in some embodiments, one or more steps or sub-steps may be combined together or performed in a different order. Method 500 is performed by DSS computing device 30. More specifically, method 500 is performed by extent pool manager 48 running on DSS computing device 30 in combination with other components of DSS computing device 30.

In step 510, PACO or rebuild operations for a storage drive 34(x) completes, and the extent pool manager 48 receives notification of such completion.

In response, in step 520, extent pool manager 48 determines whether or not any other PACO or rebuild operations are currently still proceeding for the extent pool 32. If there are, then operation proceeds with step 530 in which extent pool manager 48 directs the disk object manager 50 to reset the sensitivity of all drive objects 52 associates with storage drives 34 of the extent pool 32 to which the storage drive 34(x) regarding which the PACO or rebuild operations just completed. This may be accomplished by sending a command to disk object manager 50 directing the disk object manager 50 to reset the error weights 58 of all disk objects 52 within extent pool 32 back to the standard error weight 65.

If step 520 yields a negative result, however, operation proceeds with step 540, in which method 500 ends without performing step 530.

Thus, techniques have been presented which minimize the likelihood of a second drive 34 failing while a first drive 34 is either being rebuilt or proactively copied. In contrast with prior approaches, improved techniques adjust an error sensitivity setting 58 of drives 34 in a Mapped RAID (Redundant Array of Independent Disks) pool 32 when the Mapped RAID pool 32 is in a perilous state. Thus, for example, if one drive 34 is being proactively-copied and another drive 34 is in a "degraded" state (in which it has a high error rate that might soon cause it to be considered imminently-failing), the error sensitivity setting 58 is adjusted so that all drives 34 in the pool 32 (including the one currently being proactively copied) are less likely to be considered to have failed. If one drive 34 is being proactively-copied but no other drive 34 is in a "degraded" state, the error sensitivity setting 58 is adjusted so that other drives 34 in the pool 32 (not including the one currently being proactively copied) are less likely to be deemed to be imminently-failing. If one drive 34 is being rebuilt, the error sensitivity setting 58 is adjusted so that all other drives 34 in the pool 32 are less likely to be deemed to be imminently-failing.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by an extent pool manager running on a data storage device, the extent pool manager being configured to manage assignment of disk extents provided by a pool of storage drives of the data storage device to a set of Mapped RAID (redundant array of independent disks) extents, the method comprising:
   receiving an indication that a particular storage drive of the plurality of storage drives of the data storage device has triggered an end-of-life (EOL) condition based on an error count of that data storage drive and a standard sensitivity setting;
   in response to receiving the indication, changing a sensitivity setting of other storage drives of the plurality of storage drives to be less sensitive than the standard sensitivity setting; and
   remapping disk extents from the particular storage drive to the other storage drives of the pool of storage drives while the other storage drives of the pool of storage drives continue operation using the changed sensitivity setting.

2. The method of claim 1 wherein remapping disk extents from the particular storage drive to the other storage drives includes proactively copying data from each disk extent of the particular storage drive to a respective spare disk extent on other storage drives.

3. The method of claim 2 wherein the method further comprises:
   assigning a pool reliability score to the pool of storage drives, the pool reliability score indicating whether the pool has a high reliability or a low reliability;
   performing a decision operation, the decision operation yielding an affirmative result upon the pool reliability score indicating that the pool has a low reliability and a negative result upon the pool reliability score indicating that the pool has a high reliability; and
   in response to receiving the indication, selectively changing the sensitivity setting of the particular storage drive to be less sensitive than the standard sensitivity setting in response to the decision operation yielding the affirmative result and refraining from changing the sensitivity setting of the particular storage drive to be less sensitive than the standard sensitivity setting in response to the decision operation yielding the negative result.

4. The method of claim 3 wherein assigning the pool reliability score to the pool of storage drives includes assigning a high pool reliability score indicative of high reliability when no more than a threshold number of storage drives of the pool has a respective degraded drive reliability and assigning a low pool reliability score indicative of low reliability when more than a threshold number of storage drives of the pool has a respective degraded drive reliability.

5. The method of claim 4 wherein the RAID extents are configured using RAID 5 and the threshold number is one.

6. The method of claim 4 wherein the RAID extents are configured using RAID 6 and the threshold number is two.

7. The method of claim 4 wherein the method further comprises assigning a drive reliability for each storage drive of the pool by:
   calculating an error tag for that storage drive equal to a number of errors reported for that storage drive multiplied by an error weight;
   dividing the calculated error tag by a kill threshold to yield a ratio, the kill threshold indicating when a storage drive is to be taken out of service and its data rebuilt;
   assigning a degraded drive reliability to that storage drive when the ratio for that storage drive exceeds a predefined degraded ratio in the range of 15% to 25%; and
   assigning a non-degraded drive reliability to that storage drive when the ratio for that storage drive fails to exceed the predefined degraded ratio.

8. The method of claim 1 wherein remapping disk extents from the particular storage drive to the other storage drives includes rebuilding the data of each disk extent of the particular storage drive onto a respective spare disk extent on other storage drives using data from other disk extents assigned to a same RAID extent as that disk extent.

9. The method of claim 1 wherein:
   the method further comprises performing a decision operation, the decision operation yielding an affirmative result upon a Mapped RAID extent to which a disk extent of the particular storage drive was assigned being in a rebuildable state and the decision operation yielding a negative result upon no Mapped RAID extent to which a disk extent of the particular storage drive was assigned being in a rebuildable state; and
   remapping disk extents from the particular storage drive to the other storage drives of the pool of storage drives while the other storage drives of the pool of storage drives continue operation using the changed sensitivity setting is performed in response to the decision operation yielding an affirmative response.

10. The method of claim 1 wherein:
    receiving the indication includes:
       receiving the error count for the particular storage drive, the error count for the particular storage drive indicating how many soft media errors the particular storage drive has reported;
       calculating an error tag for the particular storage drive equal to the error count for the particular storage drive multiplied by a standard error weight associated with the standard sensitivity setting;
       dividing the calculated error tag by a kill threshold to yield a ratio, the kill threshold indicating when a storage drive is to be taken out of service and its data rebuilt; and
       triggering the EOL condition in response to the ratio exceeding a predefined EOL ratio in the range of 40% to 60%; and
    changing the sensitivity setting of other storage drives of the plurality of storage drives to be less sensitive than the standard sensitivity setting includes calculating error tags for the other storage drives to be equal to the error count for the particular storage drive multiplied by a reduced error weight associated with the changed sensitivity setting, the reduced error weight being less than the standard error weight.

11. The method of claim 10 wherein the method further comprises:
- assigning a drive reliability for each storage drive of the pool by:
  - calculating the error tag for that storage drive;
  - dividing the calculated error tag by the kill threshold to yield a ratio for that storage drive;
  - assigning a degraded drive reliability to that storage drive when the ratio for that storage drive exceeds a predefined degraded ratio in the range of 15% to 25%; and
  - assigning a non-degraded drive reliability to that storage drive when the ratio for that storage drive fails to exceed the predefined degraded ratio;
- assigning a pool reliability score to the pool of storage drives by assigning a high pool reliability score indicative of high reliability when no more than a threshold number of storage drives of the pool has a respective degraded drive reliability and assigning a low pool reliability score indicative of low reliability when more than a threshold number of storage drives of the pool has a respective degraded drive reliability;
- performing a decision operation, the decision operation yielding an affirmative result upon the pool reliability score indicating that the pool has a low reliability and a negative result upon the pool reliability score indicating that the pool has a high reliability; and
- in response to receiving the indication, selectively changing the sensitivity setting of the particular storage drive to be less sensitive than the standard sensitivity setting in response to the decision operation yielding the affirmative result and refraining from changing the sensitivity setting of the particular storage drive to be less sensitive than the standard sensitivity setting in response to the decision operation yielding the negative result.

12. The method of claim 1 wherein the method further comprises, in response to completing remapping the disk extents from the particular storage drive to the other storage drives of the pool of storage drives, returning the sensitivity setting of the other storage drives of the plurality of storage drives to the standard sensitivity setting.

13. An apparatus comprising:
- a pool having a plurality of persistent storage drives that provide disk extents to a set of Mapped RAID (redundant array of independent disks) extents; and
- processing circuitry coupled to memory configured to:
  - receive an indication that a particular storage drive of the plurality of storage drives has triggered an end-of-life (EOL) condition based on an error count of that storage drive and a standard sensitivity setting;
  - in response to receiving the indication, change a sensitivity setting of other storage drives of the plurality of storage drives to be less sensitive than the standard sensitivity setting; and
  - remap disk extents from the particular storage drive to the other storage drives of the pool of storage drives while the other storage drives of the pool of storage drives continue operation using the changed sensitivity setting.

14. A computer program product comprising a non-transitory computer-readable storage medium storing a set of instructions, which, when executed by a data storage system (DSS) computing device running an extent pool manager, the extent pool manager being configured to manage assignment of disk extents provided by a pool of storage drives of the DSS computing device to a set of Mapped RAID (redundant array of independent disks) extents, causes the DSS computing device to:
- receive an indication that a particular storage drive of the plurality of storage drives has triggered an end-of-life (EOL) condition based on an error count of that storage drive and a standard sensitivity setting;
- in response to receiving the indication, change a sensitivity setting of other storage drives of the plurality of storage drives to be less sensitive than the standard sensitivity setting; and
- remap disk extents from the particular storage drive to the other storage drives of the pool of storage drives while the other storage drives of the pool of storage drives continue operation using the changed sensitivity setting.

15. The computer program product of claim 14 wherein remapping disk extents from the particular storage drive to the other storage drives includes proactively copying data from each disk extent of the particular storage drive to a respective spare disk extent on other storage drives.

16. The computer program product of claim 15 wherein the set of instructions, when executed by the DSS computing device, further cause the DSS computing device to:
- assign a pool reliability score to the pool of storage drives, the pool reliability score indicating whether the pool has a high reliability or a low reliability;
- perform a decision operation, the decision operation yielding an affirmative result upon the pool reliability score indicating that the pool has a low reliability and a negative result upon the pool reliability score indicating that the pool has a high reliability; and
- in response to receiving the indication, selectively change the sensitivity setting of the particular storage drive to be less sensitive than the standard sensitivity setting in response to the decision operation yielding the affirmative result and refraining from changing the sensitivity setting of the particular storage drive to be less sensitive than the standard sensitivity setting in response to the decision operation yielding the negative result.

17. The computer program product of claim 16 wherein assigning the pool reliability score to the pool of storage drives includes assigning a high pool reliability score indicative of high reliability when no more than a threshold number of storage drives of the pool has a respective degraded drive reliability and assigning a low pool reliability score indicative of low reliability when more than a threshold number of storage drives of the pool has a respective degraded drive reliability.

18. The computer program product of claim 17 wherein the set of instructions, when executed by the DSS computing device, further cause the DSS computing device to assign a drive reliability for each storage drive of the pool by:
- calculating an error tag for that storage drive equal to a number of errors reported for that storage drive multiplied by an error weight;
- dividing the calculated error tag by a kill threshold to yield a ratio, the kill threshold indicating when a storage drive is to be taken out of service and its data rebuilt;
- assigning a degraded drive reliability to that storage drive when the ratio for that storage drive exceeds a predefined degraded ratio in the range of 15% to 25%; and
- assigning a non-degraded drive reliability to that storage drive when the ratio for that storage drive fails to exceed the predefined degraded ratio.

19. The computer program product of claim 14 wherein remapping disk extents from the particular storage drive to the other storage drives includes rebuilding the data of each disk extent of the particular storage drive onto a respective spare disk extent on other storage drives using data from other disk extents assigned to a same RAID extent as that disk extent.

20. The computer program product of claim 14 wherein:
receiving the indication includes:
- receiving the error count for the particular storage drive, the error count for the particular storage drive indicating how many soft media errors the particular storage drive has reported;
- calculating an error tag for the particular storage drive equal to the error count for the particular storage drive multiplied by a standard error weight associated with the standard sensitivity setting;
- dividing the calculated error tag by a kill threshold to yield a ratio, the kill threshold indicating when a storage drive is to be taken out of service and its data rebuilt; and
- triggering the EOL condition in response to the ratio exceeding a predefined EOL ratio in the range of 40% to 60%; and changing the sensitivity setting of other storage drives of the plurality of storage drives to be less sensitive than the standard sensitivity setting includes calculating error tags for the other storage drives to be equal to the error count for the particular storage drive multiplied by a reduced error weight associated with the changed sensitivity setting, the reduced error weight being less than the standard error weight.

* * * * *